G. H. MACDONOUGH.
BATTERY VAULT.
APPLICATION FILED MAR. 16, 1912.

1,037,160.

Patented Aug. 27, 1912.

Witnesses:
Ephraim Banning
Thomas A. Banning Jr.

Inventor:
George H. Macdonough.
By Banning & Banning
Attorneys.

UNITED STATES PATENT OFFICE.

GEORGE H. MACDONOUGH, OF CHICAGO, ILLINOIS, ASSIGNOR TO POTTER-WINSLOW CO., OF CHICAGO, ILLINOIS, A CORPORATION OF ILLINOIS.

BATTERY-VAULT.

1,037,160.

Specification of Letters Patent.  Patented Aug. 27, 1912.

Application filed March 16, 1912. Serial No. 684,195.

*To all whom it may concern:*

Be it known that I, GEORGE H. MACDONOUGH, a citizen of the United States, residing at Chicago, in the county of Cook and State of Illinois, have invented certain new and useful Improvements in Battery-Vaults, of which the following is a specification.

The present invention relates to a battery vault of the general type used for containing storage or other batteries employed in connection with railway signal service.

The principal objects of the present invention are to provide a compartment for the reception of switch mechanism, etc., which will be attached to and a part of the battery vault, and to so arrange and position said compartment that contamination of the switch mechanism by the fumes discharged from the battery will be eliminated.

A further object of the invention is to provide means for venting the fumes from the interior of the battery vault.

The invention further consists in the features of construction and in the combination of parts hereinafter described and claimed.

Figure 1:
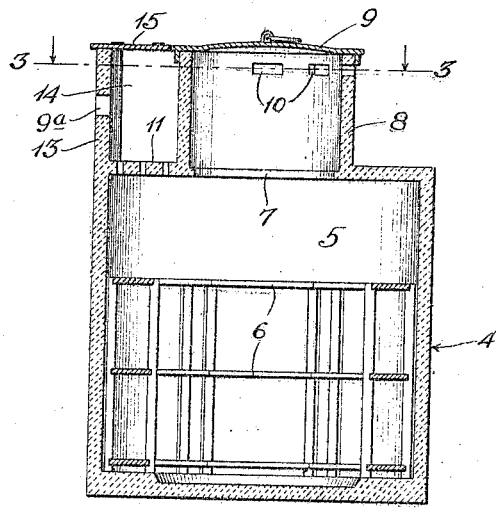
Figure 2:
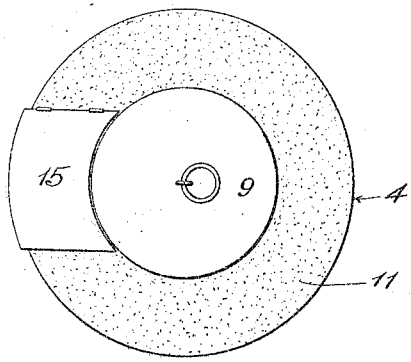

In the drawings, Figure 1 is a vertical section of a battery vault built in accordance with the teachings of the present invention; Fig. 2, a plan view of said vault; and Fig. 3, a section on line 3—3 of Fig. 1, looking in the direction of the arrow.

In the use of storage or other batteries with railway signal appliances, it is necessary to employ certain switch and other mechanisms for controlling the flow of current to and from the batteries in said vault. This invention deals with a cheap, practical and efficient method of placing these mechanisms at a convenient location with respect to the vault, and in a manner whereby the fumes arising from the battery vault will have no injurious effect upon said mechanisms.

The device as illustrated in the drawings is employed with a battery vault composed of a body portion 4 of suitable size and configuration, which is constructed to provide a battery chamber 5 of any desired arrangement, and which usually has provided therein a series of shelves 6 upon which the batteries are placed. The inlet to the battery vault is by means of a manhole 7, which is surrounded and inclosed through the medium of a neck 8 and a movable cover 9. Extending through the wall of the vault is a trunking outlet 9ª for the wires attached to the batteries. Adjacent the upper edge of the neck 8 is a series of openings 10, which provide vent passages for the gases that accumulate within the battery vault. Said vent passages open directly to the outside of the vault, and by locating them at the point indicated, the vault can be buried in the usual manner without in any way impeding the venting of these gases.

Figure 3:
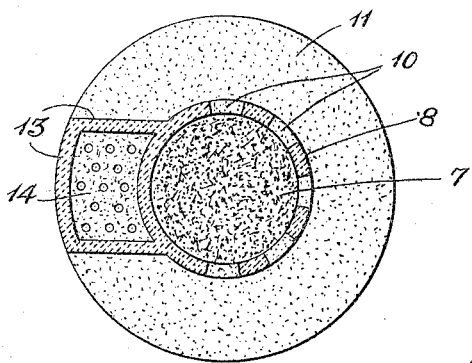

A portion of the top surface 11 of the body of the battery vault is of foraminous formation, as will be clearly seen from Fig. 3, the holes of said portion being of a size to permit a wire to be inserted therethrough and to permit a sealing substance to be tamped or otherwise placed in the holes and around that portion of the wires passing therethrough, whereby the holes are sealed so that the gases from the interior of the battery chamber cannot pass therethrough. The foraminous portion of the upper wall is inclosed by means of a series of walls 13, best seen in Fig. 3; and these walls, together with the wall of the neck 8, form a closure 14 for the reception of switch mechanism, etc., communication being had with the interior of said closure through the open upper end thereof, which open end is closed by means of a door 15 of any suitable size and construction.

By the arrangement just described, the switch and other mechanisms are inclosed in a housing which is located upon the battery vault and are placed in a position whereby the operator can view the interior of the battery vault while he is adjusting the mechanism within the housing. This point will be readily understood when it is considered that both the doors 9 and 15 are movable and can both be swung to open position; and being in close proximity to one another the operator can look into one compartment and then into the other so as to see what effect on the batteries the operation of the switch mechanism, etc., has. Moreover, the switches are located in a closure which is sealed against the passage of gas or other fumes from the battery chamber thereinto; and by providing a closure for the switch mechanism in the manner indicated, the method of construction and the cost of manufacture of the battery vault remain unchanged, and the efficiency of said vault is not decreased in any respect.

By arranging a closure or housing for the switches in the manner described, a closed housing separate from the battery is provided, and this housing does not add to the space occupied by the ordinary battery vault along the right of way. This is an important point, since the adding of structures and impediments along the right of way is highly undesirable.

It is not desirable to place the switch mechanism within the battery vault for the reason that the fumes arising from the batteries injure the switch and other controlling mechanisms. It will thus be seen that by the arrangement described, a simple and effective way of housing these controlling mechanisms is effected, which has many practical advantages in operation.

It is just as essential to keep the moisture out of the battery as it is to keep the gases and fumes away from the switch and other mechanisms, and by sealing the holes through which the wires pass a seal is provided which both serves to prevent the entrance of moisture into the interior of the vault and entrance of gases into the interior of the housing.

I claim:

1. A battery vault, comprising a body portion having a chamber for the reception of batteries, a trunking outlet therefrom, a manhole leading into the chamber, a portion of one wall of the body portion being of a foraminous formation, a structure rigidly secured to the body portion and surrounding said foraminous portion, a door permitting access to the interior of said structure, each of the holes of said foraminous portion being of a size to permit a wire to be inserted therethrough and a sealing substance to be placed about said wire, whereby passage of gases from the interior of said chamber through said holes is prevented, substantially as described.

2. A battery vault, comprising a body portion having a chamber for the reception of batteries, a trunking outlet therefrom, a manhole leading into the chamber, a portion of the top wall of the body portion being of a foraminous formation, a series of walls formed integral with the body portion and forming a closure around the foraminous portion, a door for permitting access to the interior of said closure, each of the holes of the foraminous portion being of a size to permit a wire to be inserted therethrough and a packing substance to be placed about the wire, whereby the passage of gases from the interior of said chamber through said holes is prevented, substantially as described.

3. A battery vault, comprising a body portion having a chamber for the reception of batteries, a trunking outlet therefrom, a neck extending from the upper wall of the body portion and surrounding a manhole leading to the interior of the battery chamber, a portion of the upper wall of the body portion being of a foraminous formation, a series of walls surrounding said foraminous portion and forming a closure therefor, one of said walls being a portion of the wall of the neck portion, and a door permitting access to the interior of said closure, substantially as described.

4. In a battery vault, the combination of a body portion having a chamber for the reception of batteries, a series of walls on the top face of the body portion forming a central closure and a closure to one side thereof, a door for each closure, said central closure surrounding a large opening and the other closure surrounding a foraminous surface having relatively small openings substantially as described.

5. In a battery vault, the combination of a body portion having a chamber for the reception of batteries, a series of walls on the top face of the body portion forming a central closure and a closure to one side thereof, a door for each closure, said central closure surrounding a large opening and the other closure surrounding a foraminous surface having relatively small openings, the central closure having a series of vent openings formed in its walls and located adjacent the upper edge thereof, substantially as described.

GEORGE H. MACDONOUGH.

Witnesses:
Wm. P. Bond,
Mary R. Frost.